United States Patent Office 3,579,322
Patented May 18, 1971

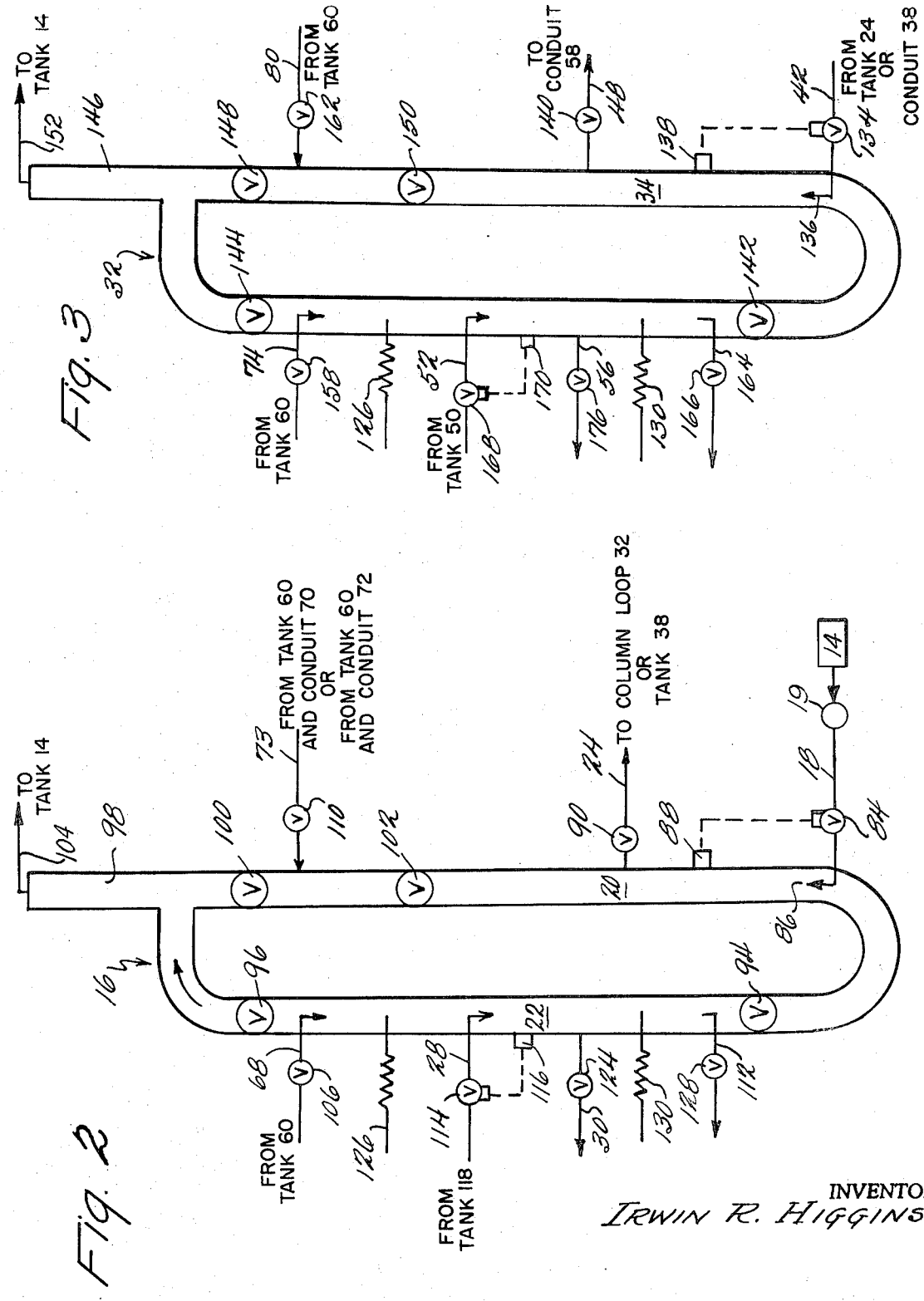

3,579,322
RECOVERY OF PHOSPHATE FROM PHOSPHATE CONTAINING POND WATER
Irwin R. Higgins, Oak Ridge, Tenn., assignor to Chemical Separations Corporation, Oak Ridge, Tenn.
Filed Dec. 1, 1966, Ser. No. 598,418
Int. Cl. C05b 7/00
U.S. Cl. 71—34       5 Claims

ABSTRACT OF THE DISCLOSURE

A continuous process for treating a waste aqueous stream containing phosphate values to recover said phosphate values including initially removing contaminating cations from the waste aqueous stream by contacting the same with a cation exchange resin bed and then contacting the essentially contaminating cation-free aqueous stream with an anion exchange resin bed to eliminate the phosphate values therefrom and then removing the phosphate values loaded on the anion exchange resin with a regenerating agent. In another embodiment, the waste aqueous stream by-passes the cation exchange resin and is contacted only with a weak-base anion exchange resin which is, thereafter, contacted with a regenerating agent, such as ammonium hydroxide to liberate the phosphate values therefrom.

---

Figure 1:
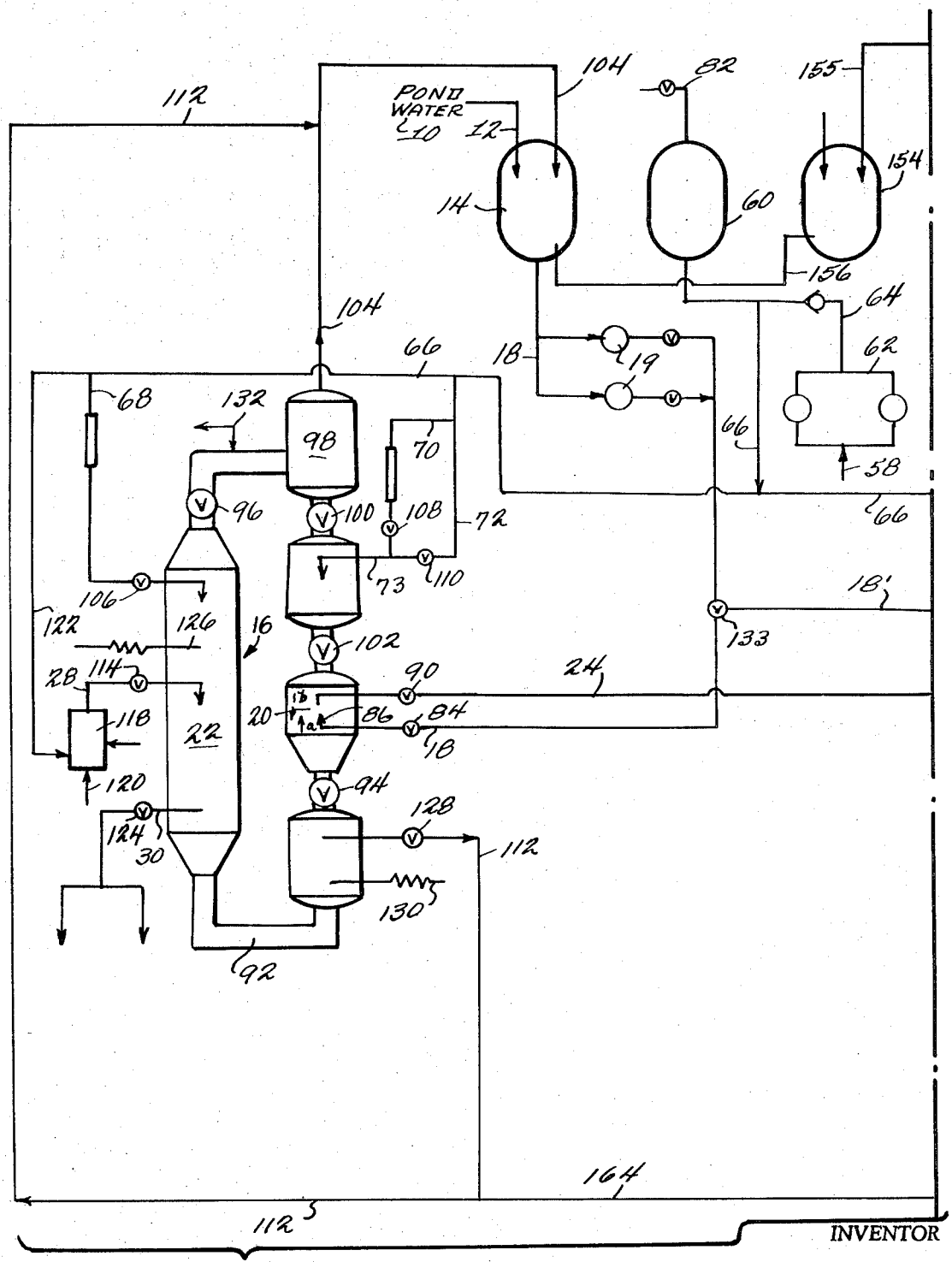

This invention relates to a method of treating waste aqueous streams containing valuable minerals to recover the same and concomitantly to condition the stream so that it can, advantageously be employed as a recycle stream.

The invention relates specifically to a process for the production of phosphates wherein phosphate ores are treated with a mineral acid, preferably sulfuric acid to produce such products as phosphoric acid, superphosphoric acid and triple superphosphates. These phosphate products are subsequently separated from the reaction mixture which includes gypsum and other mineral values, the latter generally being slurried and pumped into waste ponds.

Such separation procedures involve the use of large quantities of water to leach out phosphoric acid absorbed or contained in the impurities separated from the phosphates produced. Notwithstanding these attempts to recover the phosphate it has been found that approximately 5% of the plant output of phosphates is not recovered and is lost in the waste pond water which also contains impurities such as gypsum, fluorine, often in the form of silica flouride, as well as aluminum and iron complexes or salts, sodium and potassium. While significant quantities of the resulting pond water are recycled to the phosphate production operation, relatively large quantities are diverted for disposal into existing streams. Because the diverted portion contains high concentrations of, for instance, fluorides, a pollution problem is created. Heretofore, in order to comply with existing municipal and State laws against stream pollution, processors have found it expensive to remove contaminating values from waste streams prior to discharging the waste effluent into the waterways. Further these efforts rarely provided a commercial by-product which would offset even a slight portion of the cost required to treat such waste effluent. The instant invention, however, provides an ecnomical solution to the problem whereby waste effluent from a phosphate production plant is treated to recover valuable phosphates contained therein, to remove contaminating ions as valuable by-products, and to produce an improved effluent which can conveniently be employed as a recycle stream to the phosphate production operation.

In accordance with the present invention the improved effluent from the waste pond water treating operation can be recycled to a phosphate ore mining operation, especially to a flotation zone employed therein to recover valuable phosphate ores contained in slimes produced in hydraulic classification operations. In such flotation operations it is usual to employ significant quantities of make up water. It has been found, however, that because the make up water, which is generally supplied from deep wells, has a hardness level of about 300 p.p.m. losses of commercial flotation agents is experienced with a resulting decrease in the amount of phosphate ore recoverable. The instant invention, however, provides an effient of significantly reduced hardness value which is eminently suitable for recycle to such flotation operations, thus providing additional efficiency and savings in increased recovery of the phosphate ore which is subsequently used to produce valuable phosphate products.

It is therefore a principal object of the present invention to provide a method of processing a waste aqueous stream from a phosphate producing operation containing valuable phosphates as well as contaminating ions which overcomes the disadvantages of prior art methods.

Another object of the instant invention is to provide a method for recovering valuable phosphates, for recovering valuable by-product material of contaminating ions therefrom while at the same time conditioning the stream to reduce the hardness level there so that it is suitable as a recycle stream.

A further object of the instant invention is to provide a method for increasing the efficiency of processing phosphate ores to produce valuable phosphate products.

Figure 1A:
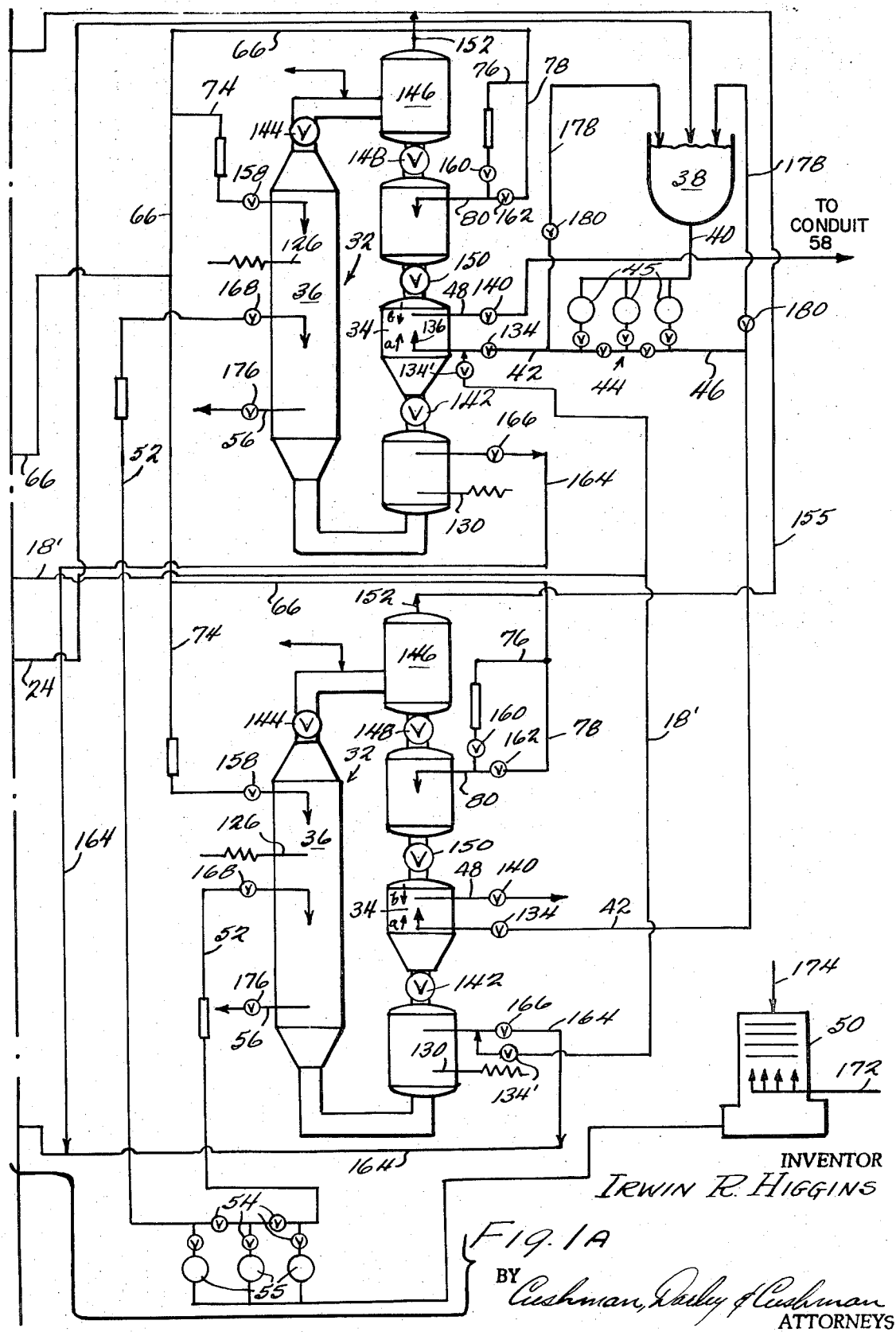

Other objects and advantages will be apparent from the following description taken in connection with the accompanying drawings wherein:

FIGS. 1 and 1A jointly form a flow sheet for an embodiment of the invention;

FIG. 2 schematically illustrates a cation exchange column loop for removing cations therefrom thereby reducing the hardness value of a waste effluent from a phosphate ore treating operation; and FIG. 3 schematically illustrates an anion exchange column loop for treating an aqueous waste effluent treated in the cation exchange column loop of FIG. 2 to recover phosphate values therefrom and/or to reduce the hardness value thereof.

GENERAL DESCRIPTION OF APPARATUS AND METHOD

The apparatus shown diagrammatically in FIGS. 1 and 1A which jointly form a flow diagram of the invention, includes only the major elements thereof and particularly illustrates the relationship of the regenerated pond water to the phosphate production system. In this figure there is shown a source 10 of waste aqueous stream from a phosphate production system which generally can be a settling pond. Leading from the settling pond is conduit means 12 which is in communication with a supply tank 14, the outlet of which is in communication with a continuous cation exchange column loop 16 via conduit 18.

The continuous cation exchange column loop 16 has two operating cation exchange sections, i.e. a loading section 20 and a stripping section 22. The direction of liquid flow is indicated by the solid arrow $a$ and the direction of the resin flow is indicated by the open arrow $b$. It will be noted that the waste stream generally flows countercurrent to the movement of the resin. An apparatus which can be used in this portion of the system is disclosed in U.S. Pat. 2,815,322, issued Dec. 3, 1957, to the present inventor.

The loading section 20 contains a strong acid type cation exchange resin in the acid form, and as the waste aqueous stream flows therethrough, the hydrogen ions are exchanged into solution and metal ions, principally calcium are absorbed on the resin. It will be noted that other metal ions are also absorbed, such as aluminum and iron. Thus an effluent of reduced hardness is taken off from the loading section via conduit 24 and is passed to a continuous anion exchange column loop 32 which will be described in greater detail below.

The metal ion rich resin now in the loading section 20 is shifted to the stripping section 22. In stripping section 22, a regenerating acid solution is passed through the resin via conduit 28 and metal ions are exchanged into solution with absorption of hydrogen ions. Thus, the solution removed from the stripping section 22 via conduit 30 is a metal salt of the regenerating acid solution.

It will be appreciated that in order to practice the present invention certain conditions must exist and be controlled. It is important to control, for instance, in the cation exchange column loop the aqueous composition in various parts therein so that the waste aqueous stream is confined essentially to the loading section and the regenerating solution is confined essentially to the stripping section. Means are also provided to shift the resin bed no more and no less than a predetermined amount in order that proper and efficient exchange will take place. Further, the volume, flow rate and concentration of the regenerating agent should be chosen so that the metal salt solution leaving the stripping section is not excessively acid although excess acid generally is advantageous.

The aqueous stream leaving the loading section 20 via conduit 24 is characterized in that it has a substantially reduced hardness value. The stream is passed to the continuous anion exchange column loop system 32 which can comprise one or more anion exchange column loops 32. Two such anion exchange column loops can be employed, in parallel, although it will be recognized that more can be used if desired. Since each of the anion exchange column loops 32 is essentially identical a general description of one will suffice.

The anion exchange column loop 32 has two operating anion exchange sections, i.e. a loading section 34 and a stripping section 36. The direction of liquid flow is indicated by the solid arrow $a$ and the direction of resin flow is indicated by the open arrow $b$. Again, as in the cation exchange column loop 16, the aqueous stream in these sections of the anion exchange column loop generally flows countercurrently to the movement of the resin.

The softened aqueous stream from cation exchange column loop 16, preferably is led to an intermediate storage vessel or holding tank 38 although it will be recognized that, if desired, this softened stream can be led directly to the anion exchange column loop 32. From the storage tank 38, the softened aqueous stream is introduced into the loading section 34 via conduit 40 and conduit 42. When more than one anion exchange column loop 32 is employed valve means 44 in communication with conduits 40 and 42 are provided to divert a portion of the softened aqueous stream from tank 38 to the other of said anion exchange column loops 32 via conduit 46.

The loading section 34 contains a weak base anion exchange resin and as softened aqueous stream flows therethrough, the hydroxyl ions are exchanged into solution and the anions of the aqueous stream are absorbed on the resin. Thus a substantially contaminating anion and cation free aqueous stream, i.e. a demineralized stream is taken off from the loading section via conduit 48 and advantageously recycled to a phosphate producing zone for high quality water uses and/or to a phosphate ore treating zone wherein phosphate slimes are subjected to, for instance, flotation techniques to increase the recovery of phosphate ore values.

The contaminating anion rich resin now in the loading zone 34 is shifted to the stripping section 36. In stripping section 36, a regenerating solution, preferably a base such as ammonium hydroxide, is passed through the resin, and the anions are exchanged into solution with absorption of hydroxyl ions. Thus, the solution removed from the stripping section 36 is a salt or complex of the regenerating base solution.

The weak base ion exchange resin in the stripping section 36 is conveniently regenerated by a base solution, the source of which conveniently can be an ammonia scrubber 50. From scrubber 50 ammonium hydroxide is introduced into the anion exchange column loop 32 via conduit 52. Preferably, when more than one anion exchange column loop 32 is employed valve means 54 can be employed in conduit 52 to divert a portion of the regenerating agent into the other of the anion exchange column loops.

Valuable anions are removed as by-products from the stripping section 36 via conduit 56, the most important being the phosphates as well as sulfates. Additionally, silicofluorides and certain residual complexes of iron and aluminum are recovered.

An advantageous feature of the novel system of this invention resides in the use of a portion of the demineralized aqueous stream from the anion exchange column loops system 32 for pulsing, i.e. shifting the resin, rinsing the resin and providing backwash for all the ion exchange column loops used. Thus a portion of the demineralized aqueous stream can be led via conduit 48 to conduit 58 which in turn is in communication wtih pneumatic water supply tank 60 via storage tank 62 and conduit 64. The outlet of pneumatic water supply tank 60 is in communication with resin rinse line for cation exchange column 16 via conduits 66 and 68, with backwash line for cation column exchange loop 16 via conduits 66 and 70 and with resin pulse line for cation exchange column loop 16 via conduits 66 and 72. Conveniently backwash line 70 and resin pulse line 72 are in communication with the cation exchange column loop 16 via conduit 73.

Further, the outlet of supply tank 60 is in communication with resin rinse line for anion exchange column loop 32 via conduits 66 and 74, with backwash line for anion exchange column loop 32 via conduits 66 and 76 and with resin pulse line for anion exchange column loop 32 via conduits 66 and 78. Conveniently, backwash line 76 and resin pulse line 78 are in communication with anion exchange column loop 32 via conduit 80. In communication with pneumatic water supply tank 60 is conduit 82 through which, conveniently is passed air under pressure from a source such as a compressor (not shown) to the tank.

DESCRIPTION OF THE APPARATUS AND METHOD OF THE CATION EXCHANGE UNIT FOR REDUCING SUBSTANTIALLY THE HARDNESS VALUE OF THE AQUEOUS WASTE STREAM

As shown best in FIG. 2, aqueous waste stream enters cation exchange column loop 16 from tank 14 through conduit 18 controlled by valve 84 and distributor means 86. Pump means 19 conveniently are provided to deliver the aqueous waste stream thereto. Valve 84, preferably, is automatically controlled by a metal-hydrogen detector 88 located adjacent the loading section 20 of the cation exchange column loop. Distributing means 86 is located at the lower end of the loading section. The aqueous waste stream passes upwardly through the cation exchange resin which completely fills section 20 and on which is absorbed the metal values thereof. Softened aqueous waste stream substantially free of metal ions such as calcium together with traces of aluminum and iron passes out of this section through conduit 24 provided with valve 90 and is conducted to a continuous anion exchange column loop 32 via storage or hold tank 38.

The continuous cation exchange column loop 16 in addition to including the loading section 20 which is arranged to permit downward flow of resin therein, also includes stripping section 22 arranged for upward flow of the resin therein. It should be recognized however, that these flow directions are only relative and can, of course, be reversed, the importance of the arrangement residing in the fact that the flow of resin to aqueous waste stream is countercurrent.

Resin-circulating conduit extends downwardly from loading section 20 and is in communication with stripping section 22 which is provided with resin valves 94 and 96 which control the flow of resin in the stripping section of the cation exchange column loop 16. The upper portion of stripping section 22 is in communication with resin reservoir 98 which, in turn, is provided with resin valves 100 and 102. Additionally, reservoir 98 is provided with conduit means 104 to permit overflow of waste resin rinse water and resin fines into aqueous waste stream storage tank 14 which conveniently can be provided with a conventional resin trap.

As can be seen cation exchange column loop 16 is provided with resin rinse line 68 controlled by valve 106 and adapted to deliver rinse water from pneumatic water supply tank 60 therein. As shown rinse water line 68 enters the cation exchange column loop 16 at a point below resin valve 96. A second water pipe 73, also leading from supply tank 60 is arranged to enter the cation exchange column loop 16 above the loading section 20 and just below resin valve 100. Depending on whether the water entering through line 73 is employed as backwash or resin pulse medium, the water delivered from tank 60 via conduit 66 will be passed through conduit 90 controlled by valve 108 or conduit 72 controlled by valve 110.

Cation exchange column 16 is also provided with slip water removal line 112 for removal of slip water at a point between resin valve 94 and the stripping section 22.

Stripping section 22 is provided with line 28 controlled by valve 114 which in turn is also responsive to a metal-hydrogen detector 116 for introducing stripping or resin regenerating agent into this section. The flow of stripping agent is downwardly or countercurrent to the upwardly flowing metal ion containing resin. Conveniently the stripping agent, for instance, an aqueous solution of a mineral acid such as sulfuric acid or nitric acid, or sulfurous acid can be provided from a storage tank 118 having an inlet 120 for introducing therein relatively concentrated stripping agent. Also in communication with resin regenerating agent storage tank 118 is water conduit 122 which is in communication with water supply tank 60 via conduit 66. Regenerating acid metal salt solution outlet 30, controlled by valve 124 is located adjacent the lower end of the stripping section 22 and below conductivity probe 126.

In operation, during the loading and stripping cycle when resin regenerating agent is flowing downwardly through stripping section 22 and a separate portion of the cation exchange resin is being loaded with metal ions from the aqueous waste stream in loading section 20, resin valves 94, 96, and 102 are closed and resin valve 100 is open. Valves 114 and 124 in pipes 28 and 30, respectively, are opened, permitting regenerating acid flow through and regenerating acid metal salt solution removal from stripping section 22. Valves 84 and 90 in aqueous waste stream charge line 18 and softened water discharge line 24 are opened, permitting upward flow of aqueous waste stream through loading section 20. Valves 128 (line 112), 106 (line 68) and 110 (line 72) may be open or closed depending on conductivity signal.

After a predetermined time of passage of resin regenerating agent through the stripping section 22, and in accordance with the principles described in U.S. Pat. 2,815,322, the cation exchange column loop 16 is operated so as to shift and replace the cation exchange resin bed contained therein by introducing a fresh portion of metal ion loaded resin.

To effect this procedure, resin valve 100, regenerating acid valve 114, metal salt solution valve 124, aqueous waste stream charge valve 84 and softened water removal valve 90 are all closed. Resin valves 94, 96, and 102 as well as valve 110 in pulse line 72 are all opened, thereby introducing a hydraulic thrust therethrough line 73 at lower part of the resin reservoir 98. Valve 128 in line 112 remains closed to prevent any water outlet flow at that point.

With the application of this hydraulic thrust, resin in the cation exchange column loop 16 is pushed around the loop, so that a portion of the resin in the loading section is introduced into the stripping section to replace substantially an equal portion which is pushed into the resin reservoir 98.

In the next step, valve 110 in pulse line 72-73 is closed, resin valves 94, 96 and 102 are closed and resin valve 100 is open. The resin that had been pushed into the upper reservoir section displaces an equal portion which drops down into the lower reservoir section. Valve 114 in regenerating acid line 28 is now opened along with valve 124 in line 30. As regenerating acid flows into stripping section 22, the regenerating acid/water interface travels downwardly to adjacent conductivity probe 130 which senses the lower conductivity of water and prevents regenerating agent from being transferred out of the cation exchange column loop 16 through line 112 by maintaining valve 128 closed when the regenerating agent hits the conductivity probe 130. At this time valve 124 is opened to allow metal salt solution to leave the cation exchange column loop 16 via line 30.

Regenerating agent will also have surrounded conductivity probe 126 in the rinse section which senses the increased conductivity and signals water to enter this section through line 66 by opening valve 106. Valve 106 is closed and the water flow ceases when the conductivity indicates that water is contacting the probe 126.

In the next step, valve 110 in pulse line 72—73 remains closed, resin valve 100 is opened, and the regenerated resin that had passed into the reservoir 98 drops into the lower section thereof. Valve 106 is now closed and valve 84 is opened to introduce aqueous waste stream through the loading section 20, the same being introduced through line 18, with softened water being withdrawn through line 24. After expiration of the established loading period, the resin movement cycle is thereafter repeated through the steps just described.

Attrition of the resin during operation is made up through supply of additional resin, as required, from a reservoir (not shown) via resin line 132.

DESCRIPTION OF THE APPARATUS AND METHOD OF THE ANION EXCHANGE UNIT FOR REMOVING SUBSTANTIALLY THE ANIONS FROM THE SOFTENED AQUEOUS WASTE STREAM

As best seen in FIG. 3, the softened aqueous waste stream leaving line 24 of the cation exchange column loop 16 is conducted to an anion exchange column loop 32. Conveniently, the softened aqueous stream can be first passed to a storage vessel 38 although it will be recognized that, if desired, this softened aqueous stream can be led directly to the anion exchange column loop 32. Preferably, as shown in FIG. 1A, two anion exchange column loops 32, in parallel, are employed. The flow of the softened aqueous stream to each of such anion exchange column loops is substantially the same as is the overall operation of each. Consequently, a description of one will suffice. The softened aqueous stream enters anion exchange column loop 32 through conduit 42 controlled by valve 134 and distributor means 136. Conduit 42 is in communication with storage tank 38 via conduit 40 controlled by valve assembly 44 provided with pump means 45. It will be obvious that when a plurality of anion exchange column loops are employed, valve assembly 44 can be adjusted, for instance, to deliver the softened aqueous stream to one or more additional anion exchange column loops via conduit 46, also controlled by a similar valve 134. Conveniently softened aqueous stream by-pass conduit 178, controlled by valve 180 can be provided to be in communication with the inlet conduit 42 or 46. Valve 134, preferably, is also automatically controlled by metal-hydrogen detector 138 located adjacent the loading section 34 of the anion exchange column loop. Distributing means 136 is located adjacent the lower end of the loading section. The softened aqueous stream passes upwardly through the anion exchange resin which completely fills the section 34 and on which is absorbed the valuable anions desired to be recovered. These anions include phosphates, sulfates and silicofluorides. A demineralized stream substantially free of these anionic materials passes out of the section through conduit 48 provided with valve 140 and is conducted to a phosphate production operation as described hereinbefore.

The continuous anion exchange column loop 32, in addition to including the loading section 34 which is arranged to permit downward flow of resin therein, also includes stripping section 36 for upward flow of the resin therein. Again these flows are relative and can be reversed, if desired.

The resin circulating conduit extends downwardly from loading section 34 and is in communication with stripping section 36 which is provided with resin valves 142 and 144 which control the flow of resin in the stripping section of the anion exchange column loop. The upper portion of the stripping section 36 is in communication with resin reservoir 146 which, in turn, is provided with resin valves 148 and 150. Additionally, reservoir 146 is provided with conduit means 152 to permit overflow of resin rinse water and resin fines into resin trap tank 154, via conduit 155 which, in turn, can be in communication with raw water supply tank 14 via conduit 156.

As can be seen, anion exchange column loop 32 is provided with resin rinse line 74 controlled by valve 158 and adapted to deliver rinse water from pneumatic water supply tank 60 therein. As shown rinse water line 74 enters the anion exchange column loop at a point below resin valve 144. A second water pipe 80, also leading from supply tank 60 is arranged to enter the anion exchange column loop above the loading section 34 and just below resin valve 148. Depending on whether the water entering through line 80 is employed as backwash or resin pulse medium, the water delivered from tank 60 via conduit 66 will be passed through conduit 76, controlled by valve 160 or conduit 78, controlled by valve 162.

Anion exchange column loop 32 is also provided with slip water removal line 164 controlled by valve 166 for removal of slip water at a point between resin valve 142 and stripping section 36. Slip line 164 conveniently can be recycled to the supply tank 14 via conduits 112 and 104.

Stripping section 36 is provided with line 52 controlled by valve 168 which in turn can also be responsive to a metal-hydrogen detector 170 for introducing stripping or resin regenerating agent into this section. The flow of stripping agent is downwardly or countercurrent to the upwardly flowing anion containing resin. Conveniently the stripping agent is ammonium hydroxide which can be provided from an ammonia scrubber unit 50 having an inlet 172 for introducing therein $NH_3$ for countercurrent contact with water entering at inlet 174. Again, when a plurality of anion exchange column loops are desired to be operated simultaneously, valve assembly 54 and pump means 55 can be regulated to deliver stripping agent to each. It will also be recognized that with this arrangement one or more of such anion exchange column loops can be employed singly or in combination. Valuable anion by-products are removed via outlet 56 controlled by valve 176 adjacent the lower end of the stripping section 36 and below conductivity probe 126.

The operation of the anion exchange column loop 32 is essentially the same as that of the cation exchange column loop 16 described in detail above. Thus the flow and movement of the resin about anion exchange column loop is effected in the same manner using the pulse line 78, its counterpart in cation exchange column loop 16 being pulse line 72. The sequence of resin valve opening and closing is also essentially the same, the resin valves 142, 144, 148 and 150 of anion exchange column loop 32 having as their counterpart in cation exchange column loop 16, resin valves 94, 96, 100 and 102 respectively. Rinse line 74, controlled by valve 158 is operated in anion exchange column loop 32 in much the same way as rinse line 68, controlled by valve 106 in cation exchange column loop 16. Delivery to and from each of the ion exchange column loops of the liquid to be treated is essentially the same as is the introduction and removal of resin regenerating agent and stripping zone effluent.

DISCUSSION OF EMBODIMENTS OF THE INVENTION

As indicated hereinbefore, when it is considered desirable to essentially recover only valuable anion products from the waste pond water, the first or cation exchange column loop can be by-passed or eliminated and the waste pond water is introduced into the second or anion exchange column loop system. Again, one or more such anion exchange column loops can be employed. If the cation exchange column loop is eliminated, obviously piping such as conduit 24, leading to the storage vessel 38 can be eliminated and the pond water can be pumped via conduit 18' either directly to the loading zone 34 of the anion exchange column loop 32 or, initially, to the storage vessel 38. When the pond water by-passes a cation exchange column loop installed in series with an anion exchange column loop, valve 133 can be positioned to direct the pond water to the anion exchange column loop. The operation of the anion exchange column loop alone is essentially the same as described hereinbefore when it is used in combination with the cation exchange column loop 16.

In yet another embodiment of the instant invention, in combination with the cation-anion operation or the anion system alone, the ammonia salt solution recovered via conduit 56 can be treated to provide other valuable by-products. Thus, the solution led from the anion exchange column loop 32 includes $(NH_4)_2SO_4$,

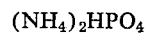

as well as $(NH_4)_2SiF_6$. Several operating techniques can be employed to produce valuable by-products, the choice of any given technique being dependent, obviously, on the by-product desired. Thus, in the production of an upgraded ammonium salt solution containing essentially only plant nutrients, it has been found advantageous to add to the effluent of conduit 56, preferably in a reaction vessel, caustic soda or soda ash to precipitate sodium silicofluoride. The mother liquor has been found to be ideally suited as a valuable fertilizer material.

Alternatively, mono-calcium phosphate can be added to the effluent of conduit 56 to precipitate calcium sulfate and calcium silicofluoride thus producing a relative pure ammonium phosphate solution. Calcium silicofluoride has a limited solubility and additional amounts can be removed from the ammonium salt solution by the addition of suitable quantities of caustic soda or soda ash.

In yet another alternative, lime can be admixed with the effluent of conduit 56 to precipitate the phosphate, sulfate and silicofluoride values therefrom. The precipitate, conveniently, can be separated from the mother liquor and advantageously employed in the production of superphosphoric acid. The resulting mother liquor is, essentially, ammonium hydroxide which can be recycled to conduit 52 for introducing into the stripping section 36 of the anion exchange column loop 32.

DISCUSSION OF SPECIFIC EMBODIMENTS OF THE INVENTION

As one specific embodiment of the invention and with reference to FIGS. 1 and 1A of the drawings herein, this system can conveniently be operated to dimineralize an aqueous waste stream from a phosphate ore treating plant wherein a typical stream or pond water contains the following constituents whose removal and recovery are desired: $P_2O_5$, 5280 p.p.m.; $F_2$, 2450 p.p.m.; $H_2SO_4$, 2610 p.p.m.; CaO, 1800 p.p.m.; $Fe_2O_3$, 250 p.p.m.; and $Al_2O_3$, 360 p.p.m. The waste aqueous stream is delivered to the loading section 20 of cation exchange resin column at a rate of 2,000 g.p.m. with the delivery pumps 19 having a rating of about 2,500 g.p.m.

A 2–5% aqueous solution of sulfuric acid resin regenerating agent can be introduced to the stripping zone 22 of cation exchange column loop 16, via line 28 at a rate of 665 g.p.m. Conveniently, the sulfuric acid solution can be prepared in situ by introducing into tower 118, 78 tons per day of 98% $H_2SO_4$ via line 120 and water in sufficient quantities via line 122 to provide the 2% solution at the indicated flow rate. The cations are removed from the stripping section 22 in the form of about a 2–5% sulfate solution at a rate of about 655 g.p.m. The sulfate composition removed is principally $CaSO_4$, $Na_2SO_4$, together with $H_2SO_4$ and traces of Al and Fe salts. The resin employed in the cation exchange column loop 16 can be any one of a number of commercially available cation resins, for instance, Dowex–50W, 8X, 16–20 mesh, a sulfonated polystyrene cation exchange resin. Of course, other resins, as well as resins having sizes ranging other than 16–20, for instance 16–100 can be used. To treat the aqueous waste stream approximately 2000 cu. ft. of resin are employed and the resin is shifted in the cation exchange column loop at a rate of about 32 cu. ft. per minute.

The cation loaded resin is moved to the stripping section in predetermined periods of time, generally in pulses lasting from about 10–20 seconds, said pulses being actuated, for instance, about every two minutes. The pulses are imparted by the introduction of water to the cation exchange column loop via line 73 and the rinse water is supplied via line 68 at a rate of about 300 gallons per minute.

The cation exchange column loop conveniently can have the following dimensions: stripping section, 8 feet in diameter and 20 feet high; loading zone, 8 feet in diameter and 8 feet high; with the sections of the column being belled to 2 feet diameter butterfly valves and 2 ft. elbows. The cation exchange column loop, preferably, is constructed of mild steel with a plastic lining rubber or type 316 stainless steel.

Softened aqueous stream is withdrawn from the cation exchange column loop via line 24 at a rate of about 2,000 g.p.m. and delivered either to the storage vessel 38 or directly to the anion exchange column loop 32. The rate of delivery of softened aqueous stream to the anion exchange column loops can be correlated with the amount of aqueous waste stream effluent from the phosphate ore treating plant so that the amounts are substantially equal thereby eliminating any substantial make-up water and providing reuse of the water in the ore treating operation.

With two anion exchange column loops operating in parallel, 1,000 g.p.m. of softened aqueous stream can be introduced into each of the anion exchange column loops also thereby correlating the effluent from the cation exchange column loop 16 with the treating rate of the anion exchange column loops. The anion exchange column loop 32 is filled with an anion exchange resin which, amongst other commercially available similar resins, can be Amberlite IRA–68, having a mesh size of 20 to 50 although it will be recognized that other sizes, for instance 16 to 100 can also be used.

The movement of the anion loaded resin in anion exchange column loop 32 is essentially the same as that of the resin movement in cation exchange column loop 16. Approximately 7000 cu. ft. of resin is employed, the resin being moved at a rate of approximately 100 cu. ft./minute. Approximately 800 gallons per minute of rinse water is employed. The regenerating agent, approximately 4 molar $NH_4OH$, is introduced into the stripping section 36 via line 52 at a rate of 85 g.p.m. in each anion exchange column loop. The $NH_4OH$ can conveniently be produced in situ in an ammonia scrubber 50 to which can be introduced 35 tons per day of $NH_3$ and water at a rate sufficient to provide the necessary flow rate and concentration of $NH_4OH$.

Approximately 85 g.p.m. of valuable anion byproducts are removed from the stripping section 36 as a 20% solution containing $$(NH_4)_2HPO_4;\ (NH_4)_2SiF_6;\ (NH_4)_2SO_4$$

as well as residual complexes of iron and aluminum. Conveniently the recovered phosphate values are ideally suited for the production of fertilizers.

As a second embodiment of the instant invention the above pond water is introduced only into an anion exchange column loop 32 containing 1100 cu. ft. of Amberlite IRA–68 anion exchange resin at a rate of 3000 g.p.m. 10.4 tons per day of 4 M $NH_4OH$ is introduced into the stripping section while 11.9 tons per day of a solution including $(NH_4)_2SO_4$, $(NH_4)_2HPO_4$ and $(NH_4)_2SiF_6$ was recovered via conduit 56. The stripping section was 15' high and 5' in diameter while the loading section was 8' high and 8' in diameter.

The ammonium salt solution removed from conduit 56 in the anion exchange system or the cation-anion exchange system is conveniently employed to produce diammonium phosphate or further treated with caustic soda or soda ash to give a fertilizer product containing essentially only plant nutrients, with mono-calcium phosphate to produce a relatively pure ammonium phosphate solution and precipitated calcium sulfate and calcium silicofluoride or with lime to produce a mixture of phosphate, sulfate and silicofluoride precipitates with an ammonium hydroxide mother liquor.

It will be understood from the foregoing description that this invention is not limited to practice according to the specific embodiments illustrated and described herein and that variations thereof can be made while not departing from the principles involved. This invention is, therefore, to be understood to be limited only by the spirit and scope of the following claims.

What is claimed:
1. A continuous process for producing a phosphate-containing fertilizer material from a waste aqueous stream resulting from mineral acid processing of phosphate ores, said waste aqueous stream containing phosphate, sulfate and silicofluoride values comprising
  (1) flowing said waste aqueous stream through a first zone in a cation exchange column loop having a cation exchange resin bed therein whereby the waste aqueous stream flowing through said first zone in said cation exchange column loop contacts said cation exchange resin and exchanges metal ions in the waste aqueous stream for hydrogen ions on the cation exchange resin;
  (2) withdrawing a softened aqueous stream containing phosphate, sulfate and silicofluoride values from said first zone in said cation exchange column loop;
  (3) contacting the cation exchange resin loaded with metal ions from step (1) in a second zone in said cation exchange column loop with a mineral acid regenerating agent to regenerate said cation exchange resin;
  (4) discontinuing the flow of said waste aqueous stream and mineral acid regenerating agent to the respective zones of the cation exchange column loop;
  (5) introducing into the cation exchange column loop a pulse medium under sufficient pressure to move cation exchange resin previously loaded with metal ions in step (1) in said first zone of the cation exchange column loop into said second zone of the cation exchange column loop for regeneration there- of and to move cation exchange resin previously regenerated in step (3) in said second zone of the cation exchange column loop into said first zone of the cation exchange column loop;

(6) flowing said withdrawn softened aqueous stream containing phosphate, sulfate and silicofluoride values from step (2) through a first zone in an anion exchange column loop having an anion exchange resin bed therein whereby said softened aqueous stream flowing through said first zone in said anion exchange column loop contacts said anion exchange resin and exchanges the phosphate, sulfate and silicofluoride values in the softened aqueous stream for the hydroxyl ions of the anion exchange resin;

(7) withdrawing a substantially phosphate, sulfate and silicofluoride free aqueous stream from said first zone in said anion exchange column loop;

(8) contacting the anion exchange resin loaded with phosphate, sulfate and silicofluoride values from step (6) in a second zone in said anion exchange column loop with an alkaline regenerating agent to regenerate said anion exchange resin;

(9) withdrawing from said second zone in said anion exchange column loop a solution of the phosphate, sulfate and silicofluoride values obtained by the regeneration operation in step (8) above;

(10) discontinuing the flow of said softened aqueous stream and said alkaline regenerating agent to the respective zones of the anion exchange column loop;

(11) introducing into the anion exchange column loop a pulse medium under sufficient pressure to move anion exchange resin previously loaded with phosphate, sulfate and silicofluoride values in step (6) in said first zone of the anion exchange column loop into said second zone of the anion exchange column loop for regeneration thereof and to move anion exchange resin previously regenerated in step (8) in said second zone of the anion exchange column loop into said first zone of the anion exchange column loop;

(12) treating the solution withdrawn from said second zone in said anion exchange column loop in step (9) above with a member selected from the group consisting of sodium hydroxide and sodium carbonate to precipitate sodium silicofluorides; and

(13) separating the sodium silicofluoride precipitate from the remainder thereby providing a substantially silicofluoride-free fertilizer.

2. The process of claim 1 wherein the cation exchange resin is a 4% cross-linked sulfonated styrenedivinyl benzene resin.

3. The process of claim 1 wherein the anion exchange resin is a weak-base anion exchange resin.

4. The process of claim 1 wherein the regenerating agent in said cation exchange column loop is sulfuric acid.

5. The process of claim 1 wherein the regenerating agent in said anion exchange column loop is ammonium hydroxide, thereby producing an ammonium phosphate containing fertilizer.

References Cited

UNITED STATES PATENTS

| | | | |
|---|---|---|---|
| 2,157,511 | 5/1939 | Urbain et al. | 210—37X |
| 3,197,401 | 7/1965 | Arai | 210—37X |
| 3,297,401 | 1/1967 | Sakomura et al. | 23—165C |
| 3,382,169 | 5/1968 | Thompson | 210—37X |
| 3,420,773 | 1/1969 | Selmeczi | 210—37X |

REUBEN FRIEDMAN, Primary Examiner

B. H. LEVENSON, Assistant Examiner

U.S. Cl. X.R.

23—88, 107, 193; 71—36; 210—24